United States Patent
Krause et al.

(10) Patent No.: US 6,732,953 B2
(45) Date of Patent: May 11, 2004

(54) WINSHIELD WASHER SYSTEM WITH HYDROCARBON SEPARATOR

(75) Inventors: Edward K. Krause, Ann Arbor, MI (US); Michael L. Greenfield, Ann Arbor, MI (US); Scott Alan Wojan, Novi, MI (US); Timothy John Wallington, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 09/682,674

(22) Filed: Oct. 4, 2001

(65) Prior Publication Data

US 2003/0066906 A1 Apr. 10, 2003

(51) Int. Cl.⁷ .................................................. B05B 1/10
(52) U.S. Cl. ................. 239/284.1; 15/250.01; 210/205
(58) Field of Search ................ 239/284.1, 284.2, 239/589.1, 303, 304, 355; 15/250.01, 250.4, 250.16, 250.29, 250.31; 210/205, 251

(56) References Cited

U.S. PATENT DOCUMENTS

| | | | |
|---|---|---|---|
| 5,261,254 A | | 11/1993 | Cattane |
| 5,453,165 A | * | 9/1995 | Bachmann ................... 202/158 |
| 5,772,912 A | * | 6/1998 | Lockyer et al. ............... 252/70 |
| 5,946,763 A | * | 9/1999 | Egner-Walter et al. .. 15/250.02 |
| 6,015,498 A | * | 1/2000 | Gleizes ....................... 210/688 |

\* cited by examiner

Primary Examiner—Michael Mar
Assistant Examiner—Thach H Bui
(74) Attorney, Agent, or Firm—Gigette M. Bejin

(57) ABSTRACT

A windshield washer system for an automotive vehicle includes a washer fluid reservoir having washer fluid therein and a separator for receiving washer fluid from the reservoir and for adjusting the concentration of hydrocarbon additive within the fluid contained within the reservoir as a function of referenced temperature.

15 Claims, 1 Drawing Sheet

WINSHIELD WASHER SYSTEM WITH HYDROCARBON SEPARATOR

BACKGROUND OF INVENTION

Figure 1:
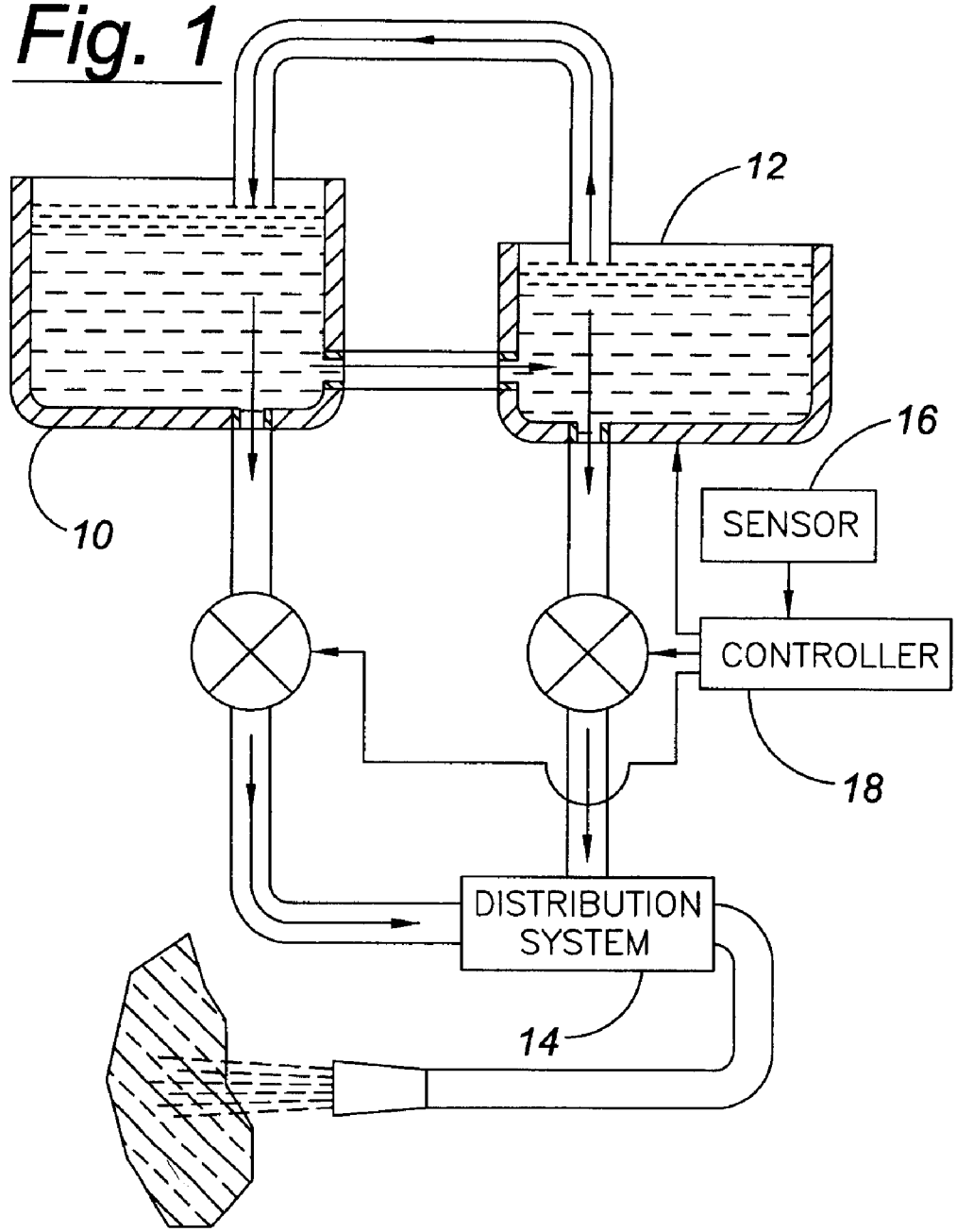

The present invention relates to a system for providing fluid having a variable concentration of hydrocarbon therein for the purpose of depressing the freezing point thereof, with the fluid being supplied to the exterior surface of the vehicle such as a windshield, for the purpose of cleaning same.

Windshield washer systems have been used in automotive vehicles for many years. As is well known, such systems typically apply a fluid which aids the action of the wiper blades in cleaning the windshield or other exterior surface, such as a lamp lens. Because many vehicles are required to operate in ambient temperatures below freezing, it has been necessary to provide an additive to the fluid so as to depress its freezing point. Typically, methanol is used for the purpose of depressing the freezing point of the windshield washer fluid. However, as vehicle emission regulations become increasingly more stringent, it has become more desirable to limit the emissions of all forms of hydrocarbons from the vehicle. Accordingly, it is desirable to limit or reduce the use of methanol. Because it is difficult to use neat water at temperatures below freezing, the present system allows the blending of two liquids consisting of a windshield washer fluid having a reduced alcohol or other hydrocarbon content and a fluid comprising mostly freezing point depressant or additive. Unlike prior art systems which apply full strength windshield washer fluid whenever fluid is called for, the present system will provide fluid having only a minimal amount of alcohol required to present freezing. In this manner, the use of alcohol is reduced.

Herein, the term "hydrocarbon additive" means any of the commonly used freezing point depressants employed with windshield washer fluid. Sometimes these fluids may include methanol, ethanol, or isopropanol. Those skilled in the art will appreciate in view of this disclosure, moreover, that other fluids based on hydrocarbons or other chemicals could be used with a system according to the present invention.

SUMMARY OF INVENTION

A windshield washer system for an automotive vehicle includes a washer fluid reservoir, fluid contained within the reservoir, with the washer fluid having an aqueous base and a hydrocarbon additive and a separator for receiving washer fluid from the reservoir adjusting the concentration of hydrocarbon additive within the fluid contained within the reservoir. The present system further includes a distribution system for providing washer fluid from the reservoir to an exterior surface of the vehicle. The separator reduces the concentration of hydrocarbon additive within the reservoir in the event that the ambient temperature is greater than freezing, increasing the concentration of the hydrocarbon additive in the event that the ambient temperature is lower than freezing. The separator may preferably comprise a distillation apparatus, a membrane apparatus, or solid absorption apparatus. All types of apparati are known to those skilled in the art of handling alcohol or hydrocarbon-based fluids and suggested by this disclosure.

According to another aspect of the present invention, the distribution subsystem included in the present windshield washer system may preferably comprise a pump and nozzle for spraying washer fluid upon an external surface of the building. The separator may further comprise a sensor for determining ambient temperature and a regulator for controlling the concentration of hydrocarbon additive within the washer fluid as a function of at least ambient temperature.

According to another aspect of the present invention, a method for minimizing the amount of freezing point depressant contained in a windshield washer fluid includes the steps of reducing the concentration of freezing point depressant in a washer fluid contained in the first reservoir, while increasing the concentration of freezing point depressant contained in a second reservoir, by introducing the freezing point depressant removed from the fluid contained within the first reservoir into the second reservoir. The present method also includes the steps of determining the ambient temperature in which the washer fluid is to be sprayed and mixing fluid from the first reservoir with fluid from the second reservoir at a ratio which is a function of at least ambient temperature. In other words, fluid having a relatively lower concentration of methanol or other freezing point depressant is mixed with fluid having a much higher concentration of methanol, so as to achieve a mixture which, although is freeze-resistant, will contain the minimum amount of alcohol to achieve the required freeze resistance.

It is an advantage of the present invention that use of methanol or other alcohol yet other type of hydrocarbon freezing point depressants with automotive windshield washer systems will be minimized.

It is another advantage of the present invention that cost of operating a vehicle will be reduced because the motorist will be able to use neat water as an additive fluid or an additional fluid for the vehicle under certain conditions.

DETAILED DESCRIPTION

As found in FIG. 1, a system according to the present invention includes a reservoir 10 which is serviced with conventional windshield washer fluid containing water and methanol at the minimum acleous base having some sort of hydrocarbon antifreeze. Separator 12 processes fluid within reservoir 10 so as to reduce concentration of hydrocarbon additive within the fluid contained within the reservoir 10. Accordingly, separator 12 includes a reservoir for removed hydrocarbon; the separation itself may occur by distillation during flow through a selective permeable membrane apparatus or by solid absorption apparatus. Such types of apparatus are commonly known to those skilled in the art and will be suggested by this disclosure.

Having reduced the concentration of the alcohol or other hydrocarbon additive in the fluid contained within reservoir 10, what is left is a fluid with a lower concentration of hydrocarbon additive in reservoir 10 and a fluid having much higher concentration of hydrocarbon additive in reservoir 12. When a driver of the vehicle calls for use of a windshield washer system, controller 18 having information from sensor 16, which is a temperature sensor supplying a reference temperature to controller 18, will direct valves 24 and 26 to open as required to achieve a proper distribution of fluids from reservoirs 10 and 12.

Sensor 16 delivers a signal corresponding to a referenced temperature to controller 18. This referenced temperature may be ambient temperature or, alternatively, a component part of the vehicle. Those skilled in the art will appreciate in view of this disclosure that many different referenced temperatures, or combinations of temperatures, could be used in a system according to the present invention.

Distribution system 14, which is really a subsystem, provides washer fluid from reservoir 10 and separator 12 to an exterior surface of the vehicle, which is shown as windshield 20, which is provided with fluid by spray nozzle 22. Distribution system 14 includes a mixer and pump of a type known to those skilled in the art and suggested by this disclosure.

When controller 18 and sensor 16 sense that the reference temperature such as ambient temperature is greater than freezing, the separator 12 will continue reducing the concentration of hydrocarbon additive within reservoir 10. Correspondingly, valves 24 and 26 will be operated so as to provide distribution system 14 with a fluid which has a lower concentration of antifreeze for provision to windshield 20. Conversely, at temperatures below freezing, controller 18 will close valve 24 to a greater extent so as to provide relatively more of the concentrated hydrocarbon additive to distribution system 14 so as to mix a fluid having a reduced freezing temperature.

While the best mode for carrying out the invention has been described in detail, those familiar with the art to which this invention relates will recognize various alternative designs and embodiments for practicing the invention as defined by the following claims.

What is claimed is:

1. A windshield washer system for an automotive vehicle, comprising:
    a washer fluid reservoir;
    washer fluid contained within said reservoir, with said washer fluid having an aqueous base and a hydrocarbon additive;
    a separator for receiving washer fluid from said reservoir and for adjusting the concentration of hydrocarbon additive within the fluid contained within the reservoir; and
    a distribution subsystem for providing washer fluid from said reservoir to an exterior surface of a vehicle.

2. A windshield washer system according to claim 1, wherein said separator reduces the concentration of said hydrocarbon additive within said reservoir in the event that the ambient temperature is greater than freezing, while increasing the concentration of the hydrocarbon additive in the event that the ambient temperature is lower than freezing.

3. A windshield washer system according to claim 1, wherein said separator comprises a distillation apparatus.

4. A windshield washer system according to claim 1, wherein said separator comprises a membrane apparatus.

5. A windshield washer system according to claim 1, wherein said separator comprises a solid absorption apparatus.

6. A windshield washer system for an automotive vehicle, comprising:
    a washer fluid reservoir;
    washer fluid contained within said reservoir, with said washer fluid having an aqueous base and a hydrocarbon additive;
    a separator for receiving washer fluid from said reservoir and for removing and retaining at least a portion of the hydrocarbon additive from the fluid, with said separator reducing the concentration of said hydrocarbon additive in the event that the ambient temperature is greater than freezing, while increasing the concentration of the hydrocarbon additive in the event that the ambient temperature is lower than freezing.

7. A windshield washer system according to claim 6, further comprising a distribution subsystem for providing washer fluid from said reservoir and said separator to an exterior surface of a vehicle.

8. A windshield washer system according to claim 7, wherein said distribution subsystem comprises a mixer for combining fluids from said reservoir and said separator.

9. A windshield washer system according to claim 8, wherein said distribution subsystem further comprises a pump and nozzle for spraying washer fluid upon an external surface of a vehicle.

10. A windshield washer system according to claim 6, wherein said separator further comprises a sensor for determining a reference temperature and a controller for regulating the concentration of hydrocarbon additive within the washer fluid as a function of at least said reference temperature.

11. A windshield washer system according to claim 10, wherein said reference temperature is ambient temperature.

12. A windshield washer system according to claim 10, wherein said reference temperature is the temperature of a component part of a vehicle.

13. A method for minimizing the amount of freezing point depressant contained in windshield washer fluid discharged by an automotive vehicle, comprising the steps of:
    reducing the concentration of freezing point depressant in washer fluid contained in a first reservoir by removing depressant from the fluid and collecting the removed depressant in a second reservoir;
    determining the a reference temperature relating to the environment into which the washer fluid is to be sprayed; and
    mixing fluid from the first reservoir with fluid from the second reservoir in a ratio which is a function of at least said reference temperature.

14. A method according to claim 13, wherein said reference temperature is ambient temperature.

15. A method according to claim 13, wherein said reference temperature is the temperature of an exterior surface of a vehicle to which the fluid is to be sprayed.

* * * * *